UNITED STATES PATENT OFFICE.

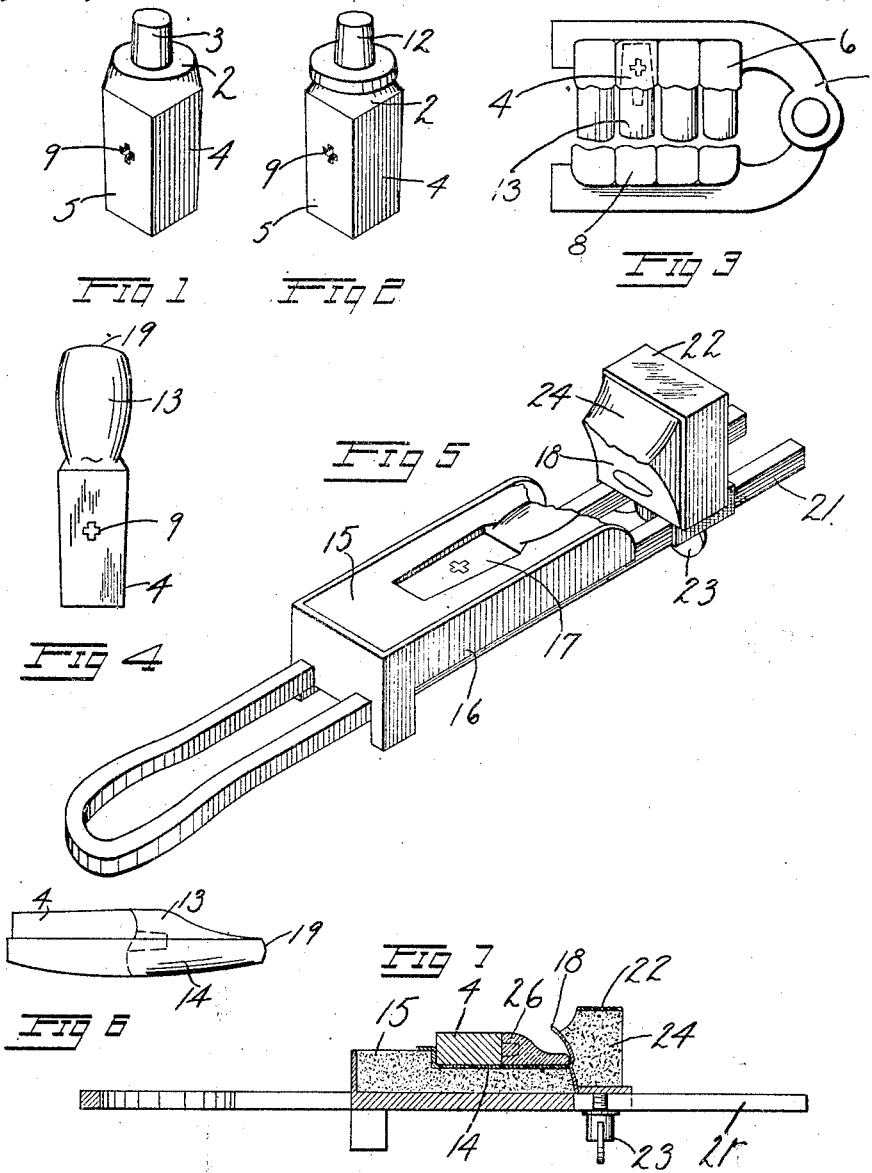

CHOTOKU NISHI, OF SAN FRANCISCO, CALIFORNIA.

APPARATUS FOR MANUFACTURING PORCELAIN JACKET-CROWNS.

1,382,010.  Specification of Letters Patent.  Patented June 21, 1921.

Original application filed March 22, 1920, Serial No. 367,842. Divided and this application filed February 14, 1921. Serial No. 444,706.

*To all whom it may concern:*

Be it known that I, CHOTOKU NISHI, a subject of the Emperor of Japan, and a resident of the city and county of San Francisco and State of California, have invented a certain new and useful Apparatus for Manufacturing Porcelain Jacket-Crowns, of which the following is a specification.

The invention relates to dentistry and particularly to an apparatus for manufacturing porcelain jacket crowns.

An object of the invention is to provide an apparatus of a construction whereby every dentist may manufacture his own porcelain jacket crowns.

A further object of the invention is to provide a simple apparatus for the manufacture of porcelain jacket crowns.

The invention possesses advantageous features, some of which, with the foregoing, will be set forth at length in the following description where I shall outline in full that form of the invention which I have selected for description and illustration in the accompanying specification and drawings.

Referring to said drawings:

Figure 1 is a perspective of the cement die of the tooth stump with the flat surfaced root portion.

Fig. 2 is a perspective of the cement die with the platinum foil matrix thereon.

Fig. 3 is a side view of the articulator with the cement die therein, the stump being covered with the wax crown model.

Fig. 4 is a front view of the cement die with the wax crown thereon.

Fig. 5 is a perspective of the porcelain mold forming device.

Fig. 6 is a side view of the cement die with the wax crown thereon.

Fig. 7 is a longitudinal section through the mold forming device with the porcelain mold in place.

My Patent No. 1,372,772 of March 29, 1921, explains a method for making porcelain jacket dental crowns and the present specification discloses an apparatus for the practice of the method.

In that method a cement die 2, and stump 3, is made of the root which stump is also provided with the root portion 4. This root portion is preferably rectangular in shape and has one of its faces, as 5, parallel with the labial or buccal side of the tooth.

A plaster model 6, is made of adjacent teeth and mounted on an articulator 7, in opposition to a wax bite 8. The root portion is then cut from the plaster model and the band and modeling compound removed therefrom and the cement die trimmed at the sides of the root portion to the desired shape. There is thus provided a cement die or duplicate of the stump, with a root portion having flat side faces. On the labial or buccal side 5, of the root portion, is an identifying mark, such as the cross 9.

On the stump is a platinum foil matrix 12, which extends down over the upper edge of the root portion. The cement die, with the matrix, is then placed in the plaster model 6, in the articulator, in opposition to the wax bite 8, and with the marked side forward, and the desired shape of the tooth is built up on the matrix with stiff wax, such as inlay wax, using the wax bite and the plaster models of the adjacent teeth, to obtain the proper contour of the wax tooth 13.

The cement die with the wax model 13, of the jacket crown is then removed from the articulator and a sheet of metal foil 14, such as tin foil, is burnished over the labial or buccal side of the model die.

From this it will be seen that I produce a model of the crown which is used with the apparatus as follows:

The model die is adapted to be pressed into modeling compound 15, contained in an open end tray 16, the compound being heated so that it is soft. The labial or buccal side of the model die, indicated by the cross, is pressed into the modeling compound to about one-half the depth of the model die, or so that a complete impression 17, of the marked side of the model die is formed. The end of the wax model preferably extends slightly from the open end of the tray. A sheet of tin foil 18, is adapted to be burnished over the projecting edge or occlusal surface 19, of the wax model.

Secured to the tray are guideways 21, on which a slide 22, is mounted to slide back and forth, a clamp screw 23, being provided for locking it in place. The slide is adapted to be filled with modeling compound 24, which is heated until it is soft, and the slide is then slipped down against the wax model to obtain an impression of the occlusal surface. When the modeling is chilled, the tin foil 18, over the occlusal surface sticks to the modeling in the slide. The slide may be then slipped backward and the model die taken from the tray, allowing the tin foil 14, to remain. The tin foil surfaces are then wiped with an essential oil, preferably oil of cloves, to prevent the porcelain from sticking. The platinum matrix is then removed from the cement die, the wax model is melted therefrom and the matrix placed back on the cement die, the stump having been painted with vaseline to seal the joint between the edge of the matrix and the die. The cement die with the matrix is then placed into the tin foil 14, in the tray, with the marked side down, and the gate with its occlusal impression is moved against the tray and locked in position.

This is a division of my application, Serial Number 367,842, filed March 22, 1920, which eventuated in the above mentioned patent.

What is claimed is:

1. An apparatus for making porcelain jacket crowns, comprising a tray open at one end and adapted to contain modeling compound, a guide secured to the tray and extending therefrom at the open end and a slide adapted to contain modeling compound mounted on said guide and movable into cooperative relation with said tray.

2. An apparatus for making porcelain jacket crowns, comprising separable wax-holding parts having open opposed ends, one section for holding a tooth model and the other movable to impress the occlusal surface of the model upon the contiguous wax.

3. An apparatus for making porcelain jacket crowns, comprising wax-holding parts with open, opposed ends, the said parts having guided movable relation so that the wax in one part may be pressed against the occlusal surface of a model in the other.

4. A hand tool for the making of porcelain jacket crowns, comprising a handle provided with a guide device, and wax-holding receptacles provided upon the handle and guide device so that the occlusal surface of a model in one receptacle may be impressed in the wax on the opposite receptacle.

5. A hand tool for the making of porcelain jacket crowns, comprising a handle provided with a wax-holding tray, and a receptacle mounted on the handle and having an open side disposed toward the tray so that upon movement of the opposed ends into juxtaposition the occlusal surface of a model in the tray will be impressed in the wax in the receptacle.

6. A molding apparatus consisting of opposed receptacles for ductile matrix material, said receptacles having guided relative movement so that an impression may be made in the material, in one receptacle, from a model placed in the other.

In testimony whereof, I have hereunto set my hand.

CHOTOKU NISHI.